United States Patent [19]
Ueda et al.

[11] Patent Number: 5,297,165
[45] Date of Patent: Mar. 22, 1994

[54] EQUALIZER FOR RADIO RECEIVE SIGNAL

[75] Inventors: Takashi Ueda; Hiroshi Suzuki; Hitoshi Yoshino, all of Kanagawa, Japan

[73] Assignee: Nippon Telegraph and Telephone Corporation, Tokyo, Japan

[21] Appl. No.: 724,612

[22] Filed: Jul. 2, 1991

[30] Foreign Application Priority Data

| Jul. 6, 1990 | [JP] | Japan | 2-179067 |
| Aug. 3, 1990 | [JP] | Japan | 2-206333 |
| Feb. 25, 1991 | [JP] | Japan | 3-30496 |
| Mar. 1, 1991 | [JP] | Japan | 3-36415 |

[51] Int. Cl.$^5$ .......................... H04B 1/10; H03C 7/00
[52] U.S. Cl. .......................... 375/12; 375/13; 375/14
[58] Field of Search .......... 328/111; 332/111, 113; 307/234; 375/22, 11, 12, 13, 14, 15; 370/9, 11; 340/825.63, 825.64, 825.73; 364/724.19, 724.20; 333/18, 22 R

[56] References Cited

U.S. PATENT DOCUMENTS

| 3,926,637 | 6/1976 | Motley et al. | 375/15 |
| 3,978,407 | 8/1976 | Forney, Jr. et al. | 375/15 |
| 4,672,630 | 6/1987 | Kaku | 375/13 |
| 4,674,103 | 6/1987 | Chevillat et al. | 375/13 |
| 4,709,374 | 11/1987 | Farrow | 375/13 |

OTHER PUBLICATIONS

"Adaptive Filter Theory", Prentice-Hall Information and System Sciences Series, Simon Haykin.
"Adaptive Transversal Filters Using Gradient-Vector Estimation", Chapter 5, pp. 194-268.
"Adaptive Transversal Filters Using Recursive Least Squares", Chapter 8, pp. 381-450.

*Primary Examiner*—Curtis Kuntz
*Assistant Examiner*—Paul Loomis
*Attorney, Agent, or Firm*—Nikaido, Marmelstein, Murray & Oram

[57] ABSTRACT

In a transversal type equalizer having a series connected delay elements, multipliers are coupled with each output of each delay element and an adder adds outputs of the multipliers to provide an equalized output signal for equalizing a time division radio receive signal for every burst in mobile communication. A receive memory (11) stores the receive signal. A transversal type equalization process circuit (77a) is coupled with the output of the memory (11). A output memory (100) stores on equalized output signal. In training tap coefficients of a transversal filter, a tap or a delay element is precluded when an absolute value of a tap coefficient is less than a predetermined value, so that calculation amount for updating tap coefficients is decreased and tracking characteristics are improved. A multiplier (15) is inserted between an output of the receive memory (11) and an input of the equalization process circuit (77a) so that a signal which is subject to equalization is phase-shifted beforehand so that frequency offset between transmit frequency in a transmitter and local frequency in a receiver is compensated. The phase adjustment by the multiplier (15) depends upon residual phase error at an output of the equalization process circuit (77a). An output memory (100) is used as a training signal to initialize the tap coefficients of the equalization process circuit (77a) during a burst when equalized output signal has an error larger than a predetermined value.

14 Claims, 16 Drawing Sheets

EQUALIZER FOR RADIO RECEIVE SIGNAL

FIELD OF THE INVENTION

The present invention relates to an equalizer for cancelling distortion in a high speed digital radio communication network. In particular, the present invention relates to such an equalizer in which there is some frequency offset between a transmit frequency and a local frequency of a receiver, tracking characteristics are adaptive depending upon change of characteristics of a transmission circuit.

BACKGROUND OF THE INVENTION

In a high speed digital mobile communication of higher than 50 kb/s, a delay distortion due to selective frequency fading caused by group delay dispersion is a serious problem. An equalizer cancels the distortion by using a delay element and a variable weight circuit.

Conventionally, an equalizer operates in two operational modes. The first mode is a training mode which initializes a plurality of variable weight circuits by using a known signal called a training signal. The second mode is a tracking mode which equalizes a receive signal, and updates finely the variable weight circuits following the change of the characteristics of a propagation path. Some conventional methods for a tracking mode are LMS (Least Mean Squares) algorithm, and RLS (Recursive Least Squares) algorithm. Those methods are described in "Adaptive Transversal Filter using Gradient-Vector Estimation" in chapter 5 in Adaptive Filtering Theory by SIMON HAYKIN, Prentice-Hall, 1986, and "Adaptice Transversal Filter using Recursive Least Squares" in chapter 8 of above book, respectively.

FIG. 1 shows a conventional block diagram of a receiver for mobile communication having an equalizer. A receive signal received by a receive antenna 61 is applied to a mixer 63 through a radio frequency amplifier 62. The mixer 63 carries out the multiplication of the receive signal and the local frequency from the local oscillator 64, and provides an intermediate frequency, which is applied to a quadrature detector 67 through a bandpass filter 65 which restricts the bandwidth of the receive signal, and an intermediate frequency amplifier 66. The quadrature detector 67 which has a local oscillator 71, a phase shifter 72 of /2, and a pair of mixers 73, provides a pair of baseband analog signals of in-phase element and quadrature element. Those elements are applied to the analog/digital converters 76 through the low-pass filters 75. The A/D converters 76 carry out the sampling and the quantization so that the input signal is converted to a digital form, and the converted digital signal is applied to an equalizer 77, which provides an equalized final output at an output terminal 78.

FIG. 2 shows a block diagram of a conventional decision feedback equalizer of a symbol tap spacing type for a mobile communication receiver.

The decision feedback equalizer comprises a feedforward transversal filter 84 for accepting an input signal IN from an output of the A/D converter, having a plurality of delay elements (T) 81, a plurality of multipliers 82 coupled with an input or an output of the delay element, an adder 83 for providing sum of outputs of the multipliers 82; a feedback transversal filter 85 which receives the output signal OUT of the equalizer, having a plurality of delay elements (T) 81, a plurality of multipliers 82, and an adder 83 for providing the sum of outputs of the multipliers 82; an adder 86 for providing the sum of two transversal filters 84 and 85; a decision circuit 87 which decides (1 or 0) the output y(i) of the adder 86, and provides an output signal OUT of the equalizer; an error detector 88 which compares the output signal OUT with the output y(i) of the adder 86 to provide an output error e(i) of the equalizer; a training memory 89 which stores a training signal for the initialization of the equalizer; and a tap coefficient calculator 90 which calculates the tap coefficients W(i) of each multipliers 82 by using the output error e(i), and input/output signals $x(i+\alpha)$ and $d(i-\beta)$ of each delay elements 81. The switch 91 in the figure switches the operation mode between the training mode and the tracking mode. In the training mode, the output of the training memory 89 is applied to the error detector 88 so that the output error e(i) is the difference between the output of the adder 86 and the output of the training memory 89. In the tracking mode, the output signal OUT is applied to the error detector 88 so that the output error e(i) is the difference between the output of the adder 86 and the equalized output signal OUT.

The equalizer of FIG. 2 operates first in the training mode in which the tap coefficients of the multipliers 82 are initialized by using a known training signal, and next in the tracking mode the equalization operation is carried out by using the initialized tap coefficients.

FIG. 3 shows the characteristics of the equalized output signal wherein an input signal is QPSK modulation signal, and the operational algorithm of the tap coefficient calculator in the equalizer is RLS algorithm. FIG. 3 shows the phase and the equalized output in the form of a projection on the Q-axis. FIG. 3(A) shows the case where the change of the characteristics of the propagation path is small, and it is found that the equalized signal is kept to that of the QPSK in both the training period and the tracking period, and the tracking characteristics are satisfactory. FIG. 3(B) shows the case where the change of the characteristics of the propagation path is large. In this case, the tracking characteristics are satisfactory only at the beginning of the tracking period, but the operation can not follow the change of the phase shift caused by the propagation path and the equalized phase becomes out of that of the QPSK signal.

Further, when there is some frequency offset between carrier frequency of a transmitter and local frequency of a receiver, the tracking characteristics in an equalizer are not satisfactory.

FIG. 4 shows the curve of a bit error rate of an equalizer when a frequency offset exists. In FIG. 4, the horizontal axis shows frequency offset in Hz, and the vertical axis shows bit error rate. It is found in FIG. 4 that only 300 or 400 Hz of frequency offset deteriorates the bit error rate characteristics considerably.

It should be noted that the amount of the frequency offset would be larger than several kHz in an actual communication circuit, and therefore, the compensation of the frequency offset is important.

Conventionally, a frequency offset is compensated by using a PLL (phase lock loop) which is coupled with an output of an equalizer. However, a prior PLL circuit has the disadvantage that it takes long time for locking-in the initial phase. If we try to increase gain of feedback loop of a PLL circuit to shorten the lock-in time, the operation of the PLL circuit would be deteriorated by the noise. Therefore, an equalizer which operates excellently, even when a frequency offset is large, must be developed.

Still another disadvantage of a prior art is as follows.

In a mobile communication, the propagation conditions, including absolute delay time of receive signal determined by the distance between transmitter and receiver, time difference of receive time of fast wave via the shortest propagation path and delayed wave via the roundabout propagation path, and absolute amplitude of rapid wave and delayed wave, change always reflecting the movement of a receiver.

As for the change of absolute delay time, a stable frame synchronization signal must be established, however, as it is difficult, a practical apparatus absorbs the change of the frame synchronization signal by increasing the number of taps of an equalizer.

Also, when time difference of receive time of fast wave and delayed wave is large, and/or when the state of propagation path is a non-minimum phase condition, the number of taps of an equalizer must be increased so that the residual inter-symbol interference is decreased.

On the other hand, the number of taps of an equalizer may be small, when a propagation path generates no delayed wave.

Conventionally, the number of taps of an equalizer is fixed so that the satisfactory communication quality is obtained even in the worst propagation condition. However, an equalizer having a large number of taps has the disadvantage that the calculation amount for the adaptive algorithm of the tap coefficient is increased, and the tracking characteristics following the change of the propagation path are deteriorated. In other words, an equalizer having a fixed number of taps has the disadvantage in the tracking characteristics.

Still another disadvantage of a prior art is as follows.

When the change of the propagation path is large, an adaptive algorithm can not follow quickly the change. In order to solve this problem, conventionally, the length of a transmission signal in a frame is shortened as compared with that of a training signal. Another prior solution is to insert a plurality of training signals in each burst.

However, above conventional solutions have the disadvantage that the transmission efficient is decreased. Another prior solution for a prior RLS algorithm is the use of a forgetting factor for exponential weighted RLS algorithm, but it has the disadvantage that the operation becomes unstable.

SUMMARY OF THE INVENTION

It is an object, therefore, of the present invention to overcome the disadvantages and limitations of a prior equalizer for received signal by providing a new and improved equalizer.

It is also an object of the present invention to provide an equalizer which has the least number of taps.

It is also an object of the present invention to provide an equalizer which can compensate frequency offset between a transmit frequency and a local frequency in a receiver.

It is also an object of the present invention to provide an equalizer which can follow the large change of propagation path during tracking period, by effecting feedback learning of tap coefficients.

The above and other objects are attained by an equalizer for radio receive signal comprising; a receive signal memory (11) for storing a burst of receive signal each having a training series signal and a data series signal; an equalization process circuit (77a) for equalizing a signal read out of the receive signal memory (11) and for providing equalized output signal at an output terminal (78); the equalization process circuit (77a) comprising a plurality of series connected delay elements (81) each providing a predetermined delay time, a plurality of multipliers (82) coupled with input/output of the delay elements for providing tap coefficients, an adder (83) coupled with output of the multipliers (82) to provide equalized output, and a tap coefficient calculator (90) for adjusting tap coefficients according to equalization error (e(i)) of equalized output for a training series signal; an adaptive parameter calculator (51) for calculating absolute of a tap coefficient for each tap; and a tap number decision circuit (53) for determining whether each tap is used or not used according to comparison of the absolute with a predetermined value.

Preferably, the present equalizer has a phase error detector (19) coupled with output of the equalization process circuit (77a) for detecting phase error of output of the equalization process circuit (77a); a frequency offset estimator (21) for providing frequency offset to be compensated in a training period according to detected phase error by the phase error detector; a multiplier (15) located between output of the receive signal memory (11) and input of the equalization process circuit (77a) for adjusting signal phase; and amount of phase adjustment by the multiplier (15) being initialized by the frequency offset estimator (21), and then controlled by output of the phase error detector (19).

Still preferably, the present equalizer has an equalized output memory (100) for storing equalized signal coupled with output of the equalization process circuit (77a), and a feedback learning control (104) for effecting feedback learning of tap coefficients of the equalization process circuit (77a) by using content of the equalized output memory (100) as a training series signal when equalized quality to data series signal is lower than a predetermined threshold.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The application of the present invention is not restricted to a particular field. Preferably, the present invention is used in equalizing a digitally modulated signal. Still preferably, the present invention is used in a phase modulation signal.

Figure 5A:
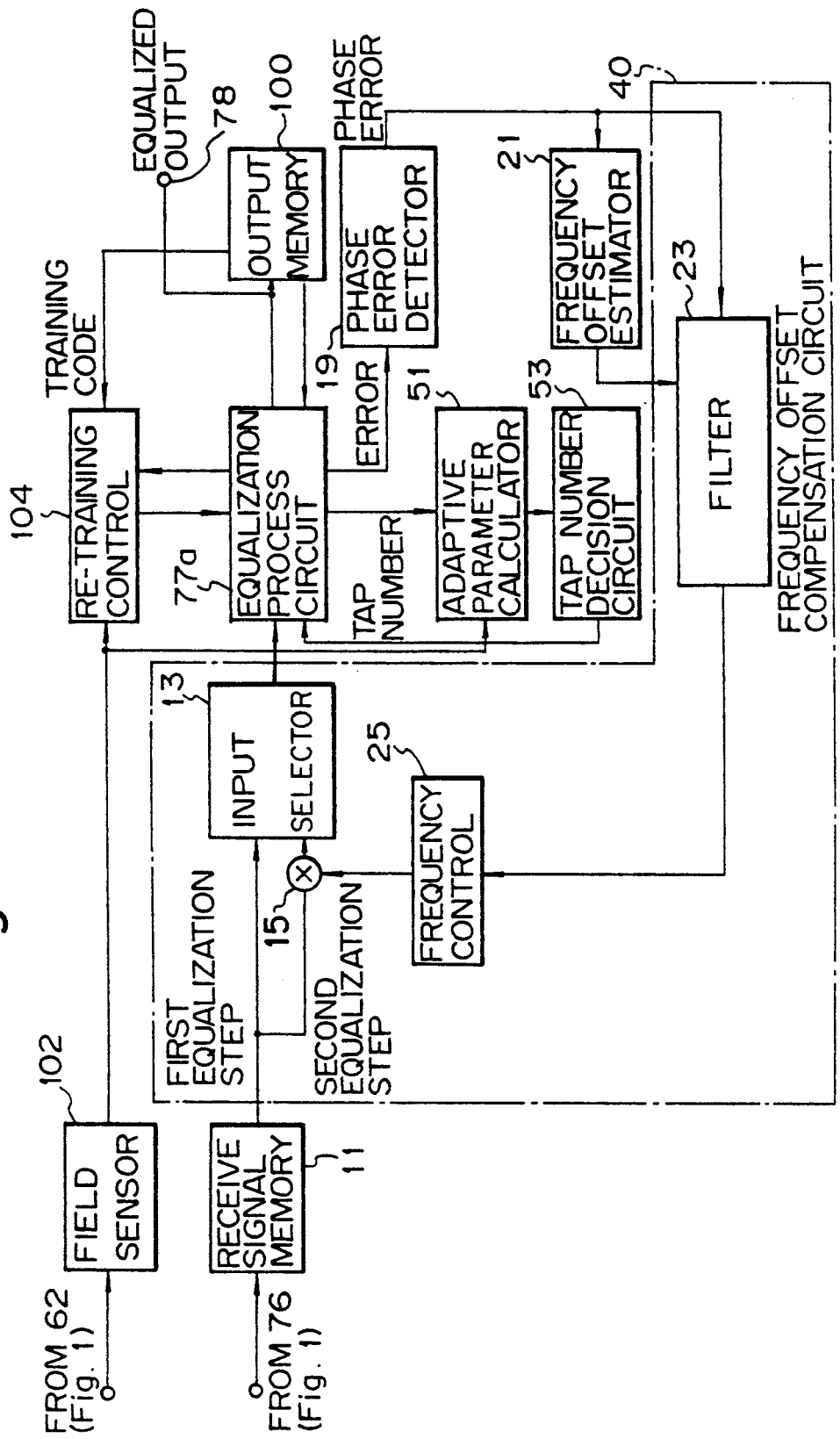
FIG. 5A is a block diagram of the equalizer according to the present invention.

FIG. 5A shows a block diagram of the equalizer according to the present invention.

Figure 5B:
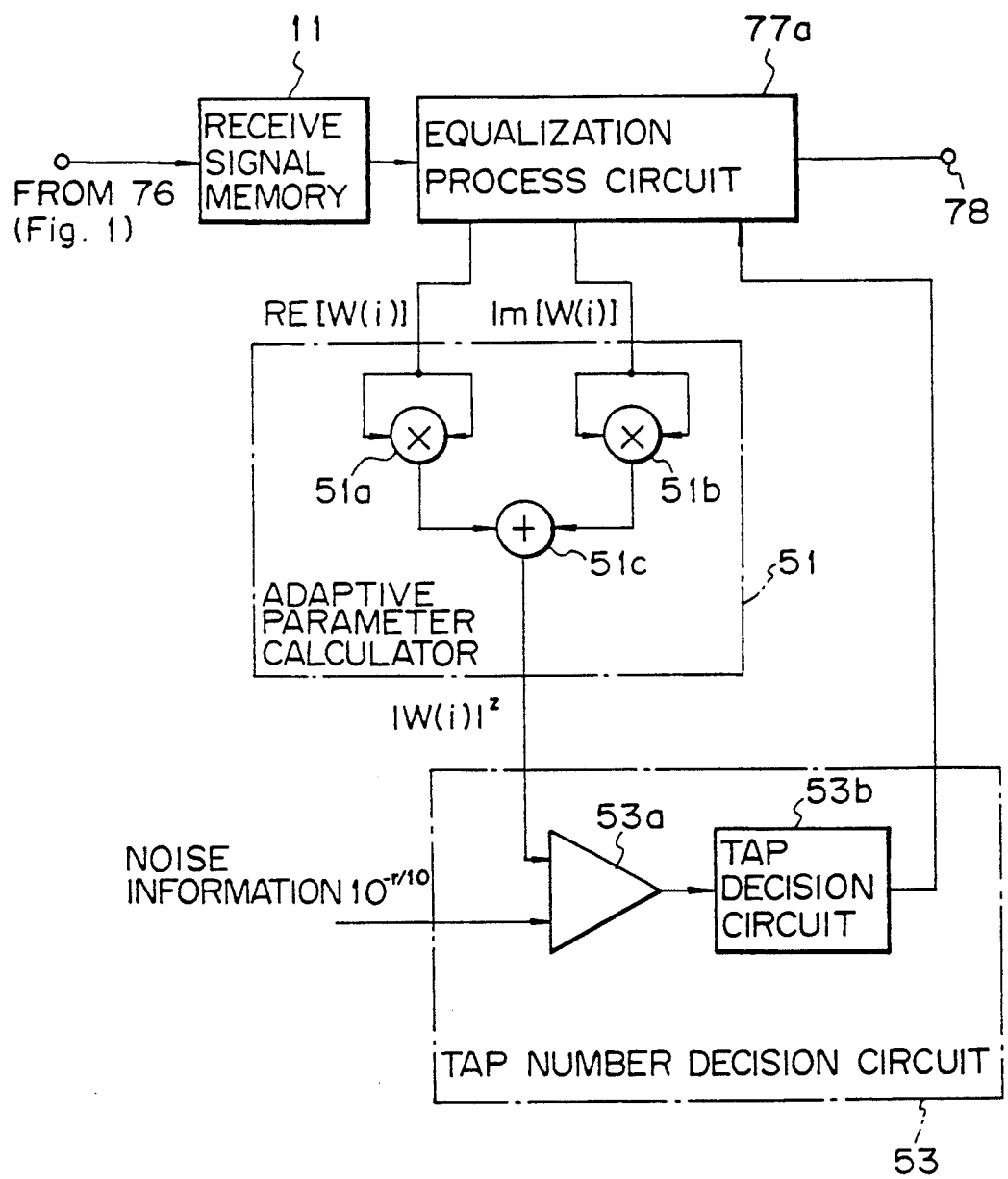
FIG. 5B shows a block diagram of the embodiment of the present invention.
Figure 5C:
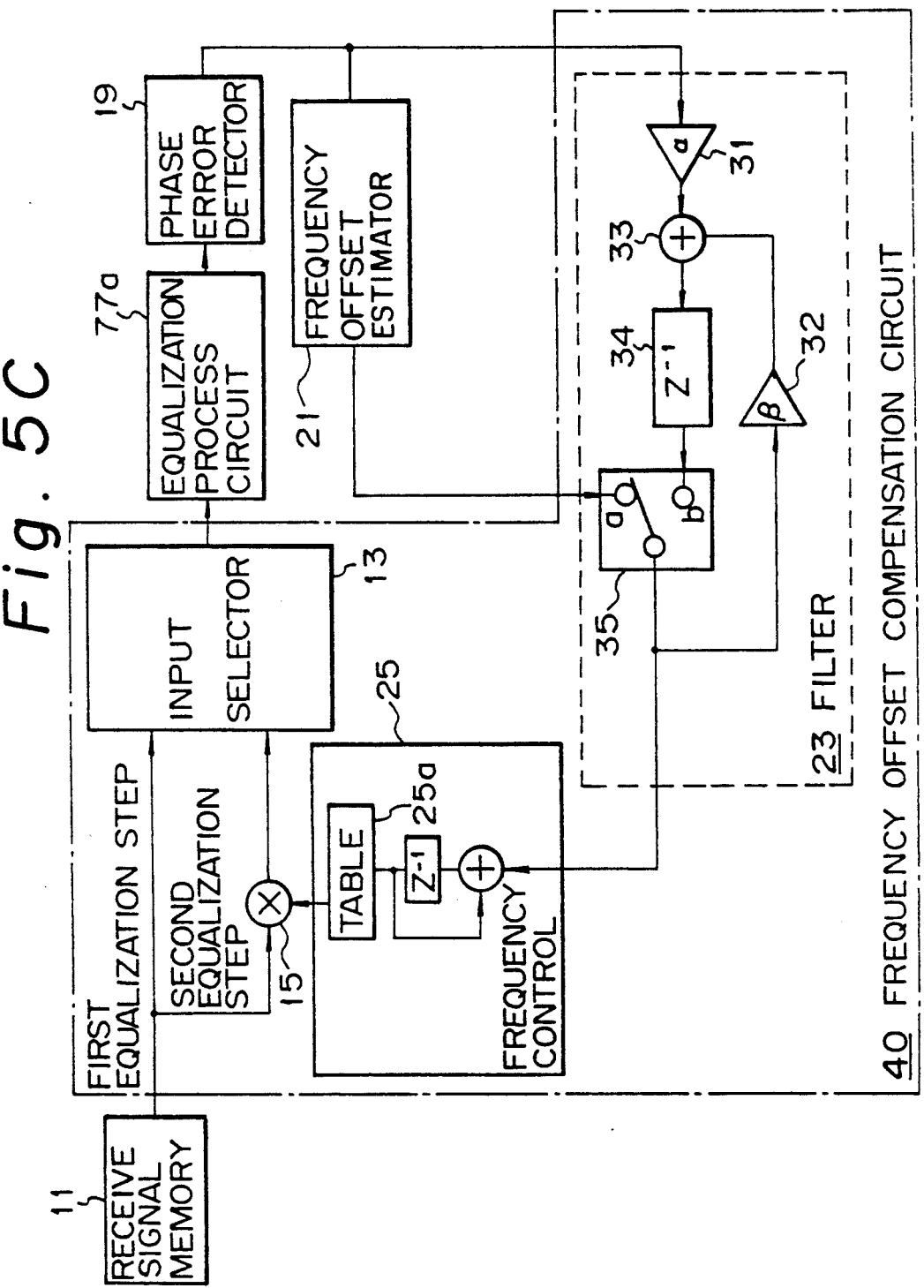
FIG. 5C is a block diagram of another embodiment of the present invention.
Figure 5D:
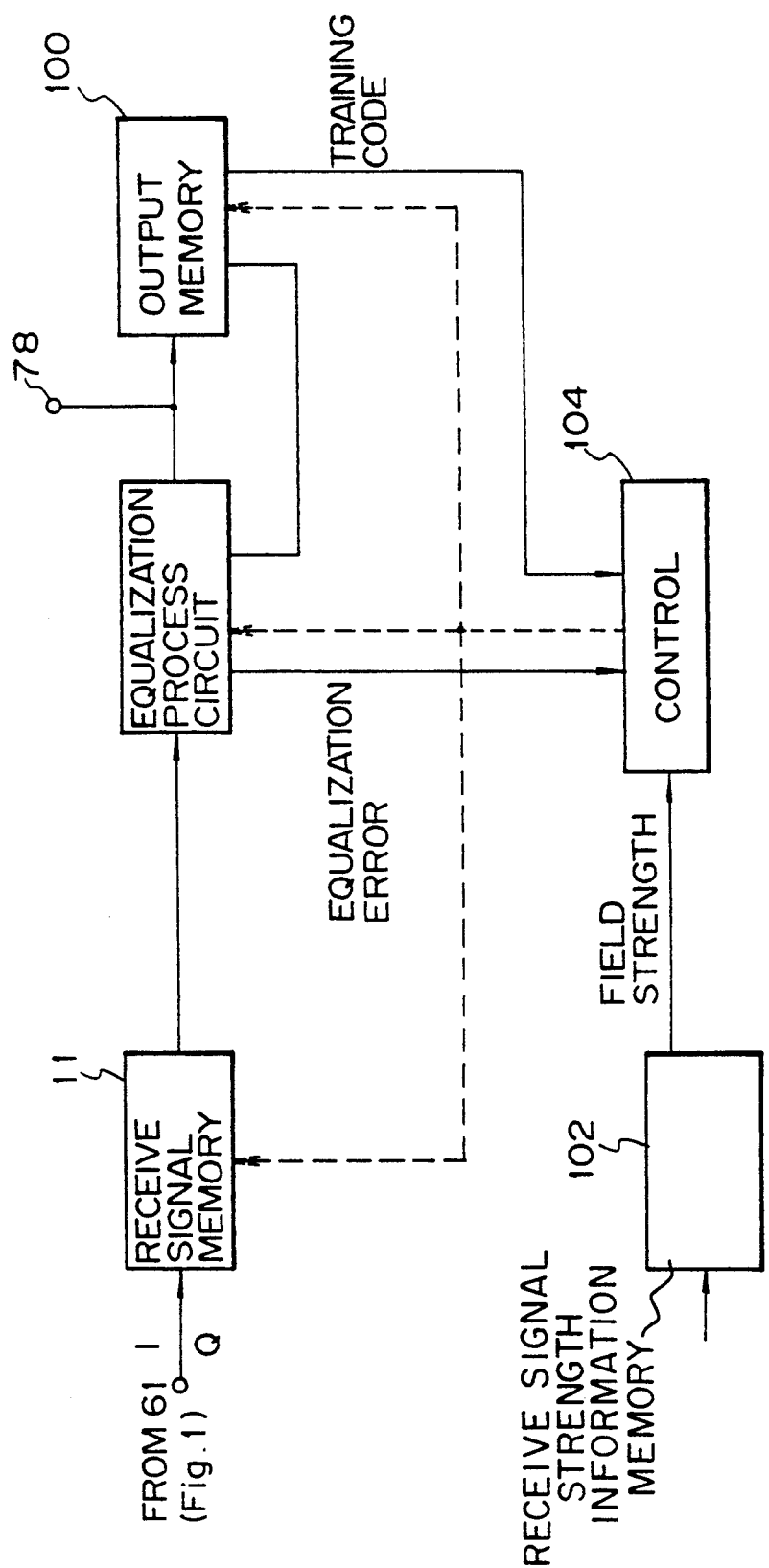
FIG. 5D is a block diagram of still another embodiment of the present invention.

The present invention has the following features for fulfilling the objects.

a) The number of taps of a transversal filter is determined as small as possible. FIG. 5B is a block diagram for this operation, and is a part of FIG. 5A.

b) A frequency offset between a transmit frequency and a local frequency of a receiver is compensated in the equalizer. FIG. 5C, which is a part of FIG. 5A, shows a block diagram for this operation.

c) The tap coefficients of the taps of a transversal filter are re-initialized during tracking period, if the equalization error exceed a predetermined level. FIG. 5D, which is a part of FIG. 5A, shows a block diagram for this operation. This operation is called feedback learning.

Figure 1:
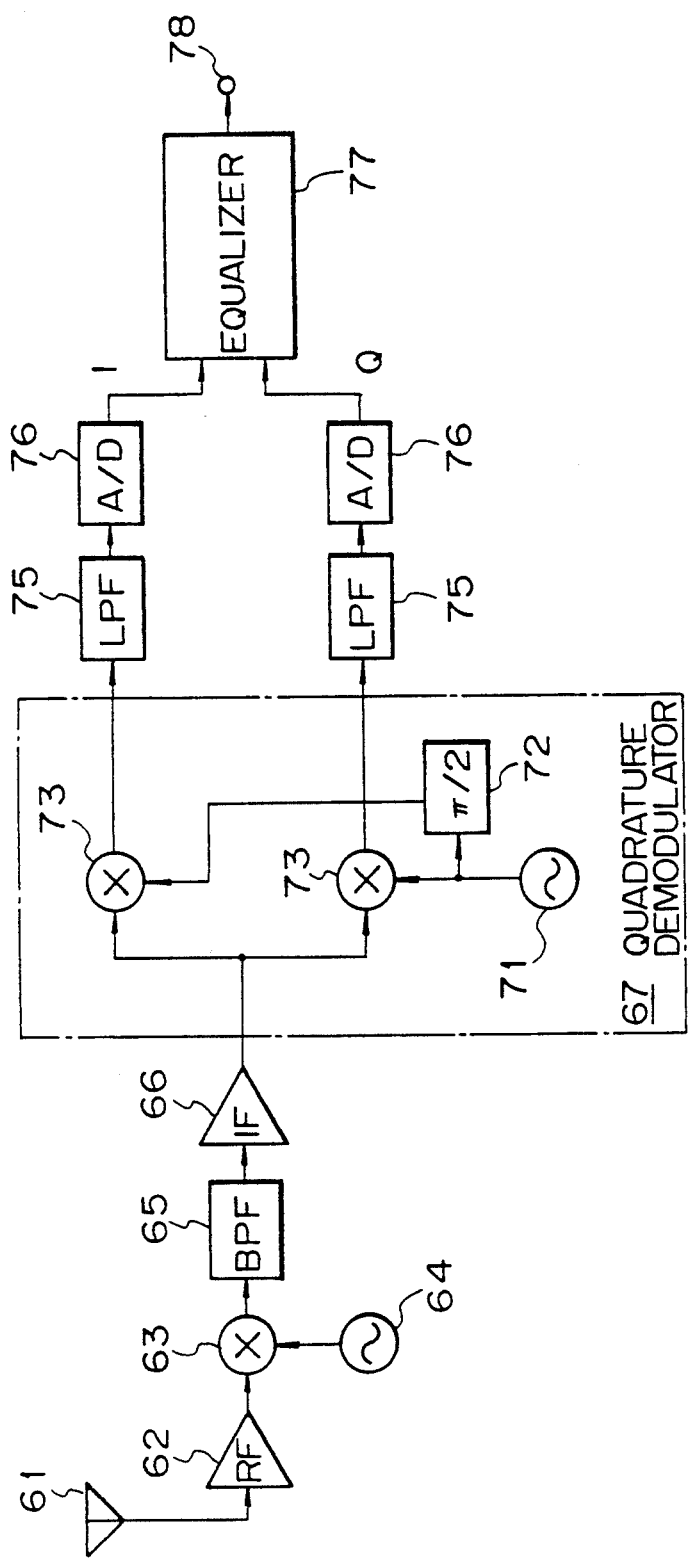
FIG. 1 is a block diagram of a radio receiver which the present invention is applied.

In FIG. 5, the numeral 11 is a receive signal memory which is coupled with outputs of the A/D converters 76 in FIG. 1. The input of the memory 11 is a complex number having a real part (in-phase element), and an imaginary part (quadrature element).

The numeral 40 is a frequency offset compensation circuit, which has an input signal selector 13 which selects one of the output of the receive signal memory 11 and the output of the multiplier 15, a filter 23, and a frequency control circuit 25.

Figure 2:
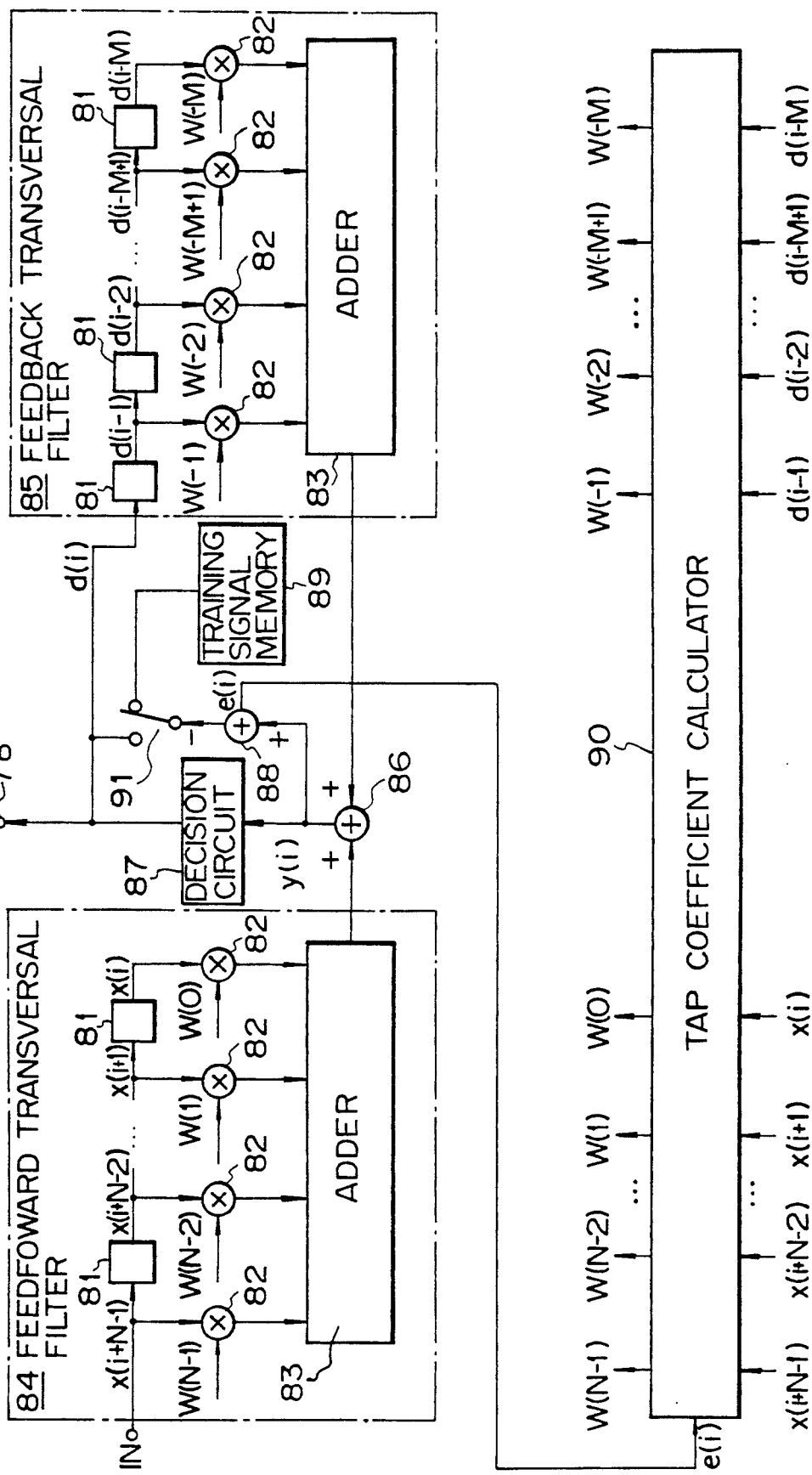
FIG. 2 is a block diagram of a conventional filter.
Figure 3A:
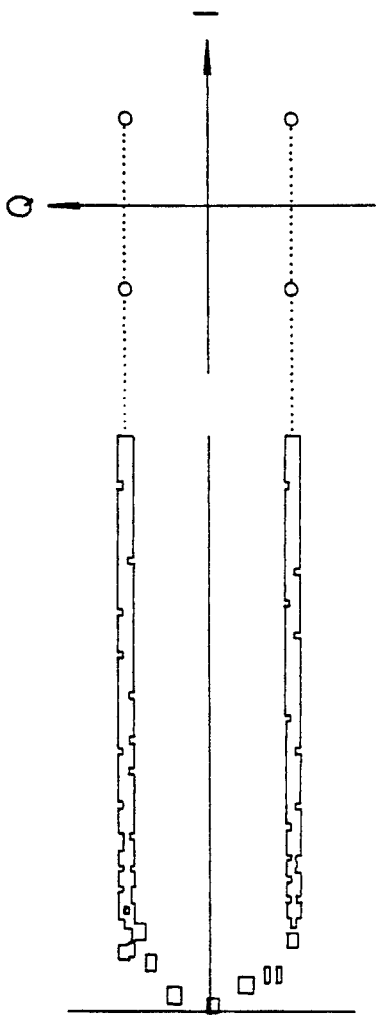
FIGS. 3A-3B shows the equalized output signal projected on the Q-axis when the RLS algorithm is used as the adaptive algorithm for an input QPSK signal.
Figure 3B:
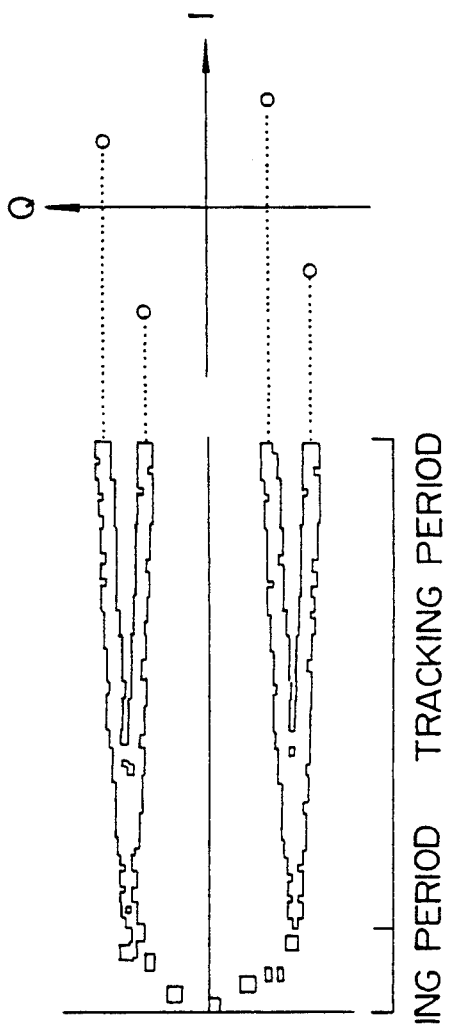
Figure 4:
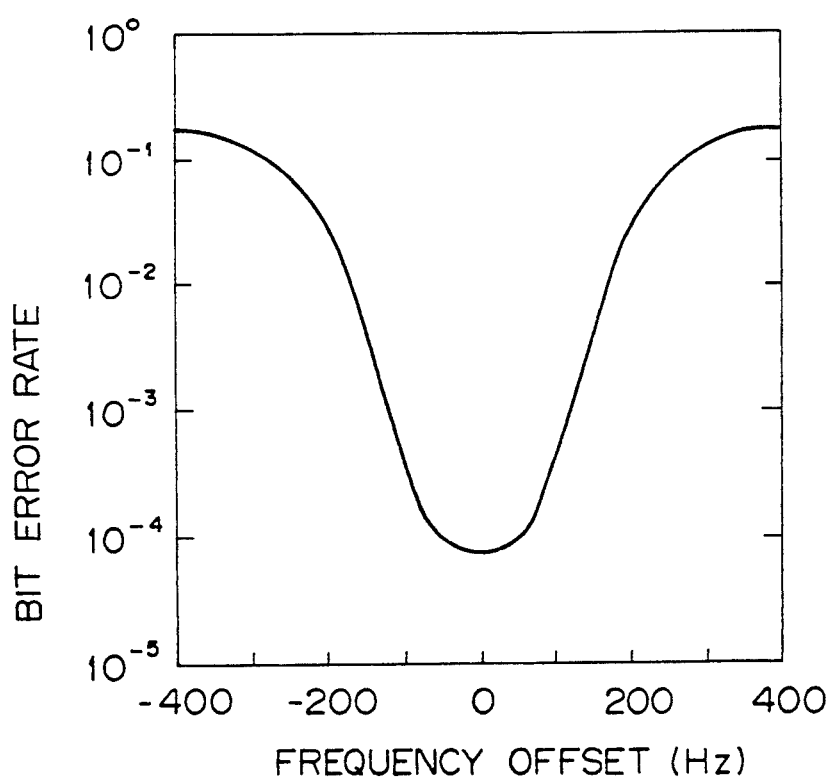
FIG. 4 shows the curve of bit error rate when some frequency offset exists.

The numeral 77a is an equalization process circuit which has the similar structure to that of 77 in FIG. 1, or the structure of FIG. 2.

The numeral 19 is a phase error detector, 21 is a frequency offset estimator.

The numeral 51 is an adaptive parameter calculator, 53 is a tap number decision circuit.

The numeral 100 is an output memory, 102 is a receive signal strength information memory which is coupled with an amplifier 62 in FIG. 1, and stores the instantaneous receive level corresponding to the content of the receive signal memory 11.

The numeral 78 is an output terminal which provides an equalized output signal.

Figure 6A:
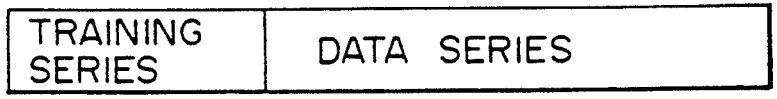
FIGS. 6A-6C shows some examples of structure of a burst signal which is subject to equalization.
Figure 6B:
Figure 6C:

It is assumed that the present equalization system equalizes the tap coefficients of an equalization process circuit 77a for every receive burst signal, which has a training series signal and data. The training series signal which is used for adjusting tap coefficients is for instance located at the beginning of the data in each burst receive signal as shown in FIG. 6A. Alternatively, the training series signal may located between a pair of data signals in each burst receive signal as shown in FIG. 6B. Further, the training series signal may be located after the data signal in each burst receive signal as shown in FIG. 6C.

The training series signal is used for initializing tap coefficients of an equalization process circuit, and the data in each burst is equalized by using the initialized tap coefficients.

a) Decision of Number of Taps

A block diagram of the related portion for the decision of number of taps is shown in FIG. 5B. In the figure, the equalization process circuit 77a carries out the initialization of the tap coefficients by using the training series signal stored in the memory 11. That operation is conventional.

When the tap coefficients converge, the number of taps is determined. The equalization process circuit 77a provide the value of the tap coefficient of each tap. That tap coefficient is a complex number having a real part Re[W(i)] and an imaginary part Im[W(i)], where i is an integer showing the location of the i'th tap. In the adaptive parameter calculator (tap coefficient power calculator) 51, the multipliers 51a and 51b provide the square of the absolute value of the real part and the imaginary part, respectively. The adder 51c provides the sum of the outputs of the multipliers 51a and 51b. That sum is expressed as $|W(i)|^2$, which is the square of the absolute value of the complex value W(i).

The sum of the square of the absolute value is normalized by dividing each sum by the maximum sum, which is usually W(0). The tap number decision circuit 53 has a comparator 53a which compares the output of the adder 51c with a predetermined value which is, for instance, noise level on the communication line. When the noise level is r (dB), the value $10^{-r/10}$ is used as the predetermined value to be applied to the reference input of the comparator 53a. The tap decision circuit 53b determines if the tap (i) is necessary or unnecessary depending upon the output of the comparator 53a. The output of the tap decision circuit 53b is applied to the equalization process circuit 77a.

The reference level to the comparator 53a is not restricted to noise level, but also receive level of a receiver, or an output of an equalization error of the equalization process circuit 77a may be used as the information of the reference level.

In the present invention, it is determined that a tap is necessary if the normalized square $|W(i)|^2$ of the tap coefficient of the tap is larger than the reference input level, where the normalized value is the ratio of the square to the maximum square of the absolute value of the tap coefficients.

Figure 7A:
FIGS. 7A-7C shows the example of the output of the adaptive parameter calculator 51 in FIG. 5B.

In the embodiment of FIG. 7(a), the taps W(1), W(0) and W(−1) are necessary, and other taps are unnecessary. Preferably, a pair of taps outside of the necessary taps are taken for taking the safety side considering the effect by jitter of a clock signal and a frame signal. Therefore, the taps W(2) and W(−2) are taken in this case. Therefore, five taps are used in this case (W(2), W(1), W(0), W(−1) and W(−2)).

The delay elements (T) relating to non-selected taps (W(4), W(3), W(−3) and W(4) in this case) are not used.

The initial training operation is carried out again by using the reduced number of taps. Then, after the training operation, the tracking operation is carried out for the data signal stored in the memory 11. The reduction of the number of taps improves the tracking performance of an equalizer, and reduces or shortens the calculation amount or the calculation time during the tracking period.

Figure 7B:
Figure 7C:
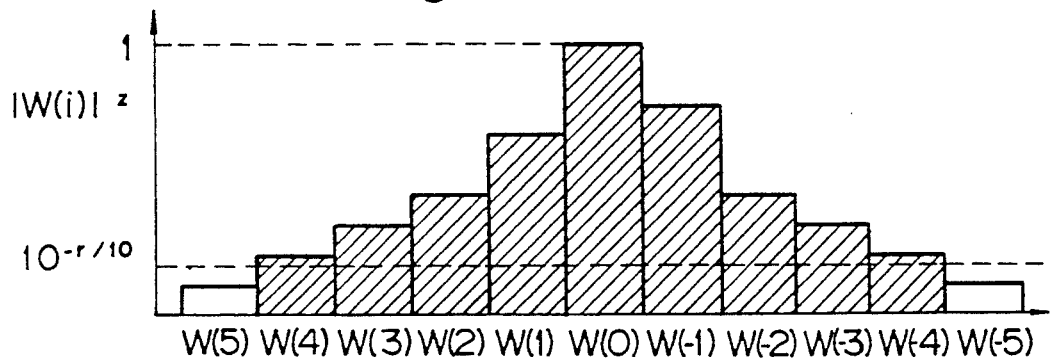

FIG. 7B shows the case that the value $|W(i)|^2$ relating to all the taps in a decision feedback equalizer exceeds the value $10^{-r/10}$ of the noise level r dB. The extreme ends W(4) and W(−4) have the larger value than $10^{-r/10}$, and therefore, further pair of taps are necessary at the outside of the taps. So, further taps W(5) and W(−5) are introduced, and then, the training operation is carried out by using the training series signal stored in the memory 11. The result is shown in FIG. 7C, which shows that the square value of the absolute value of the tap coefficients W(5) and W(−5) is less than $10^{-r/10}$, and therefore, no further addition of taps is necessary. So, eleven taps are used in this case. The operation of the equalizer goes into the tracking phase with eleven taps.

In one modification, when an adaptive algorithm for adjusting tap coefficients is an RLS algorithm, a gain vector K(i) is obtained together with tap coefficients W(i). The gain vector K(i) shows the gradient of the tap coefficient. Even if the square of the absolute value of a tap coefficient is small at a given moment, it is very probable that the value increases suddenly if the absolute value of the gain vector is large. Therefore, it is preferable to consider not only the value of the tap coefficients, but also the value of the gain vectors, in determining the number of taps.

Figure 8A:
FIGS. 8A-8B is another example of the output of the adaptive parameter calculator 51 in FIG. 5B.
Figure 8B:
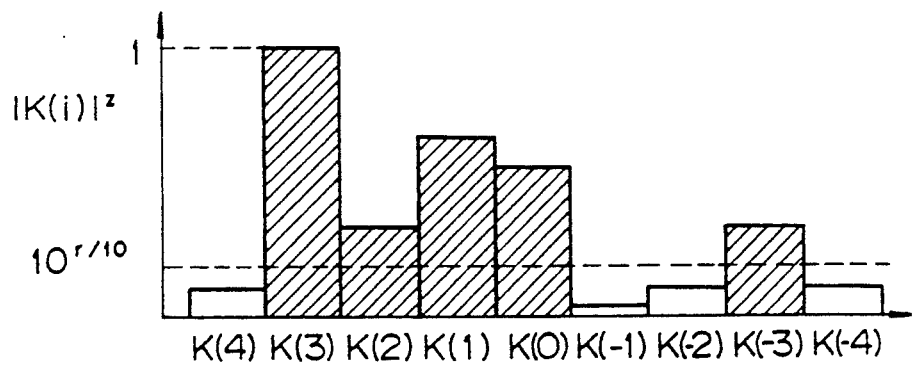

FIG. 8A and FIG. 8B show one example of the tap coefficients $|W(i)|^2$ and the gain vectors $|K(i)|^2$ in a decision feedback equalizer using an RLS algorithm. In FIG. 8A, it is found that the values for W(3) and W(−3) are smaller than the threshold, however, FIG. 8B shows that the gain vectors K(3) and K(−3) corresponding to W(3) and W(−3) are larger than the threshold value. That means that it is very probable that the values for W(3) and W(−3) are largely increased in a short time. Therefore, it is not preferable to remove the taps W(3) and W(−3) in this case. It is preferable that the adaptive parameter calculator 51 and the tap number decision circuit 53 are designed considering the gain vector.

Figure 9A:
FIGS. 9A-9B is still another example of the output of the adaptive parameter calculator 51 in FIG. 5B.
Figure 9B:

FIG. 9A and FIG. 9B show still another case of tap coefficients, and gain vectors in a decision feedback equalizer. In this case, a tap which has the largest tap coefficients of all the taps is not the center tap W(0), but W(3). That kind of state happens when a frame synchronization circuit of a receiver can not follow the change of absolute delay time between a transmitter and a receiver. The state of FIG. 9A is changed to that of FIG. 9B by carrying out training so that a sample in a memory 11 is read out at a shifted address of the memory. The number of taps is decreased by carrying out that process even when the largest tap coefficient is not the center tap.

b) Frequency Offset Compensation

When there is frequency offset between a transmit frequency and a local frequency in a receiver, the frequency offset is compensated as follows.

The block diagram of a part of the frequency offset portion is shown in FIG. 5C, which is a part of FIG. 5A. In FIG. 5C, the numeral 11 is a memory which stores a burst signal including both a training series signal and data, 13 is a signal selector for selecting one of a) output of the memory 11, and b) the output of the mixer or the multiplier 15, 19 is a phase error detector, 21 is a frequency offset estimator, 23 is a filter, 25 is a frequency control circuit, 31 and 32 are amplifiers, 33 is an adder, 34 is a delay circuit of the delay time of one symbol time, and 35 is a switch. The numeral 77a is an equalization process circuit which is the same as 77a in FIG. 5B. In FIG. 5C, thick lines show a line which handles complex numbers, and thin lines show a line which handles only real number.

The circuits including the filter 23, the frequency control circuit 25, and the complex multiplier 15 constitute a phase lock loop for frequency offset compensation.

1) First operation step

In the first step, the signal selector 13 takes the first path from the output of the memory 11. Then, the training series signal stored in the memory 11 is applied to the equalization process circuit 77a through the signal selector 13. The equalization process circuit 77a carries out the initialization of the equalizer in the training period. Then, the phase error detector 19 detects a residual phase error during a predetermined period in data which follows a training series signal, and stores the error for each sample. The frequency offset estimator 21 takes the difference between each adjacent pair of errors stored in the phase error detector 19, and takes the average of the differences. The relations between the average of the errors and the frequency offset to be compensated are stored in a read only memory (not shown). So, the frequency offset estimator 21 outputs the initial frequency offset value by reading out the read only memory.

The samples for the frequency offset compensation are taken in the data series after the training series, because the equalization errors, except that by the frequency offset, decreases during the training period, and the main portion of the residual error during the tracking period is that by, the frequency offset.

Figure 10A:
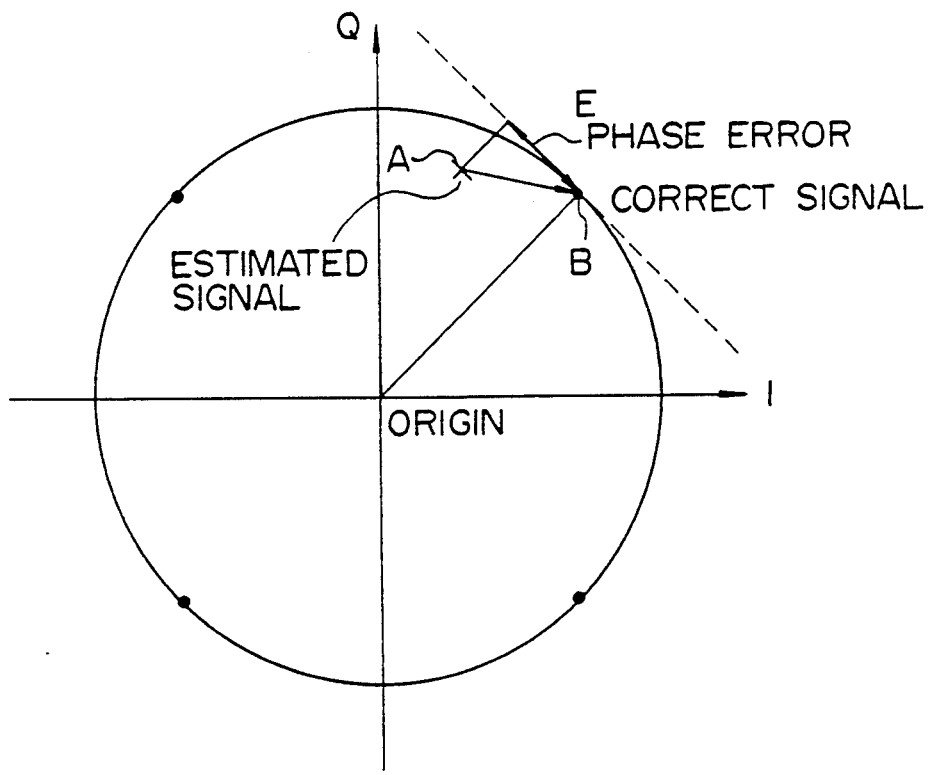
FIGS. 10A shows one example of definition of a phase error.
Figure 10B:
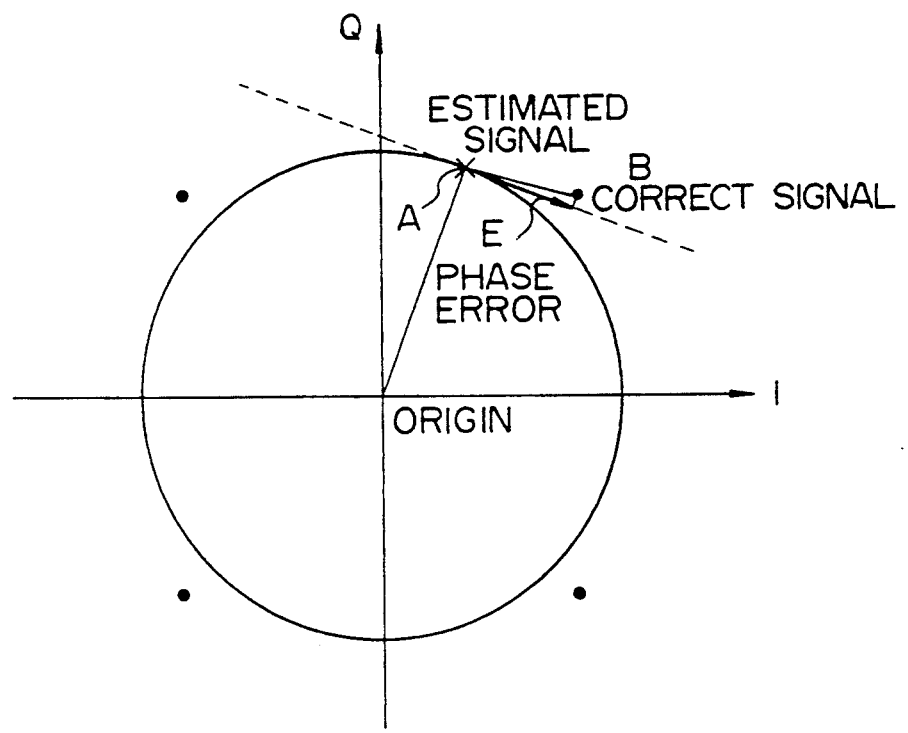
FIG. 10B shows another definition of a phase error.
Figure 10C:
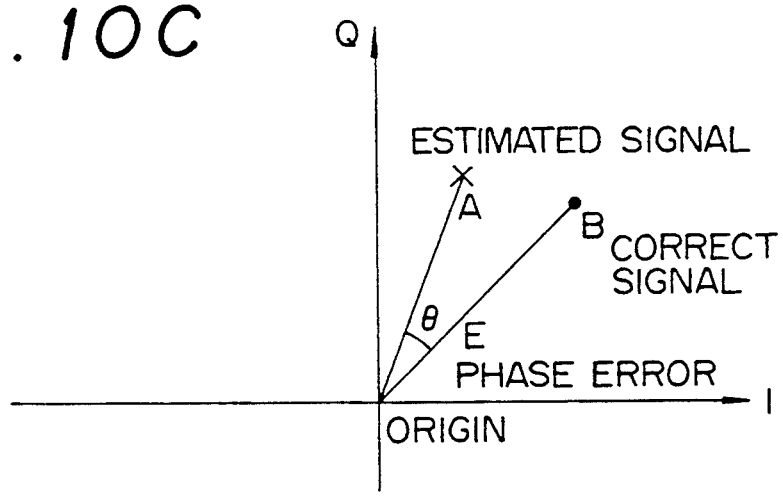
FIG. 10C shows still another definition of a phase error.

The phase error in this case is defined as shown in FIG. 10A, 10B or 10C. In FIG. 10A, the point A shows the output of the equalization process circuit 77a on the signal space diagram, and the point B shows the correct signal on the diagram. The error E is the difference between the vector B and the vector A. The error vector E has the tangent component to the circle that has the radius equal to the length between the origin 0 and the correct data B. Alternatively, the phase error is defined as shown in FIG. 10B, in which the phase error E has the tangent component to the circle that has the radius equal to the length between the origin 0 and estimated signal A. Alternatively, the phase error is defined as shown in FIG. 10C, in which the phase error is defined as an angle between the line connecting the origin and the measured signal A, and the line connecting the origin and the correct signal B.

The frequency offset estimator 21 provides an initial compensation value of frequency offset according to the phase error as defined above. The frequency offset estimator 21 is implemented by a ROM, having a table of a phase error and a preferable initial compensation value of frequency offset.

Next the initial compensation value is applied to the frequency control circuit 25 through the switch 35, and the filter 23.

Then, the switch 35 is connected to the contact (b) which is connected to a delay element 34 in the filter 23, so that the complex multiplier receives the signal for frequency offset compensation.

2) Second operation step

In the second operation step, the signal selector 13 selects the output of the complex multiplier 15, but not the direct output of the memory 11, and the switch 35 is connected to the contact (b). The memory 11 is read out again, and the phase of the read out signal is modified by the complex multiplier 15, which forwards the modified signal to the equalization process circuit 77a. The second operation step works to the same signals stored in the memory 11 as those in the first operation step, and the tap coefficients of the equalization process circuit 77a are adjusted for the phase modified input signals which consider the frequency offset compensation.

Following the second operation step, the phase error detector 19 detects a phase error at an output of the equalization process circuit 77a, and the filter adjusts finely the frequency offset to be compensated according to the output of the phase error detector 19, so that the fine change of the frequency offset is compensated.

The frequency control circuit 25 has an integrator with a delay element ($Z^{-1}$) and an adder, and a ROM table 25a which provides the frequency shift according to the output of the integrator. The integrator is initialized by the output of the frequency offset estimator 21 in the first operation step, and then, provides the value;

$$\theta_t = \theta_{t-1} \Delta \theta_t$$

in the second operation step, where $\theta_t$ and $\theta_{t-1}$ are the outputs of the integrator at time t and t−1, respectively, and $\Delta \theta_t$ is output of the filter 23 at the time t.

The filter 23 has a delay element ($Z^{-1}$) 34, a pair of amplifiers 31 and 32, and an adder 33. The initial state of the delay element 34 is set in the first operation step by the frequency offset estimator 21 in the first operation step, and the filter 23 provides the following output in the second operation step.

$$\Delta \theta_t = \beta \Delta \theta_{t-1} + \alpha e_{rr}$$

where $e_{rr}$ is phase error provided by the phase error detector 19, and $\alpha$ and $\beta$ are gain of the amplifiers 31 and 32, respectively.

Figure 11:
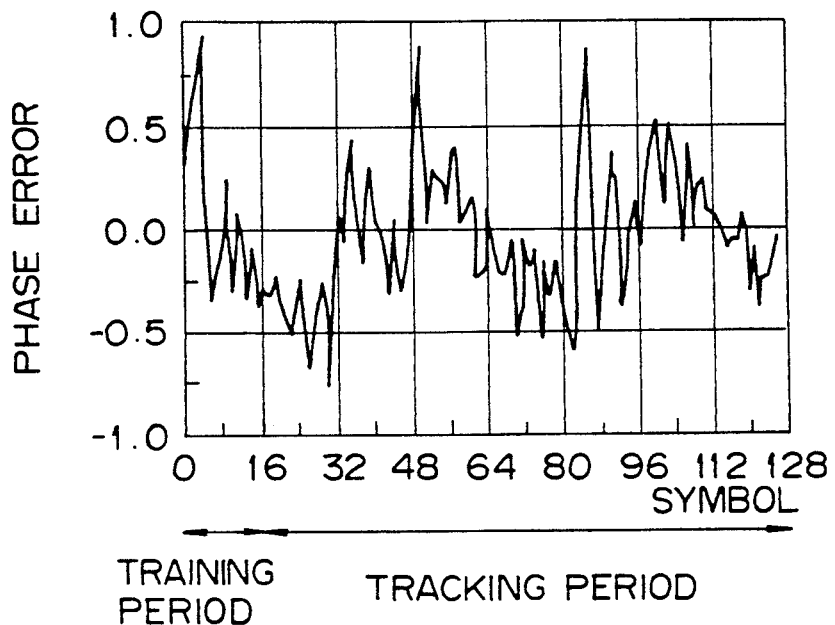
FIG. 11 shows an output signal of a phase detector when a first equalization step is completed.
Figure 12:
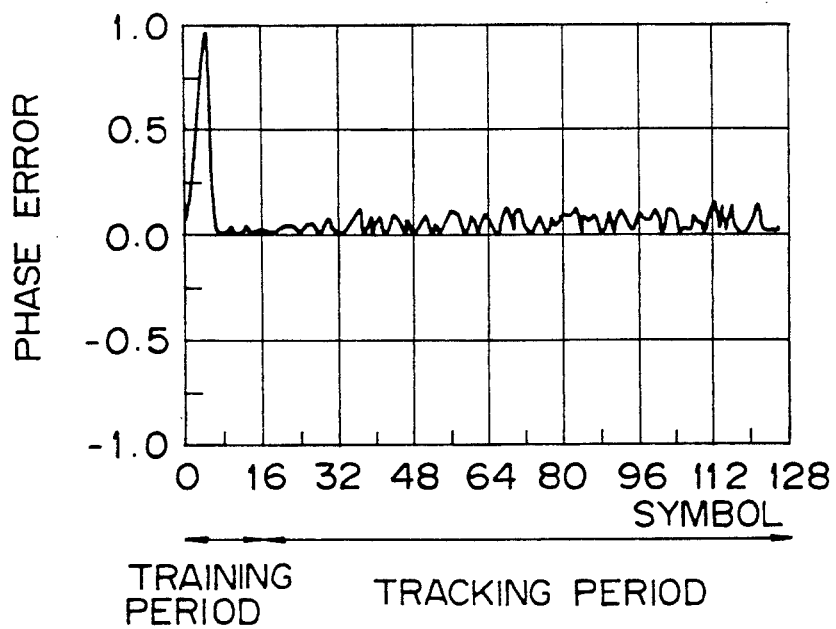
FIG. 12 shows an output of a phase error detector when a frequency offset is compensated according to the present invention.

FIGS. 11 and 12 show the phase error in a training period, and a tracking period of a prior art, and the present invention, respectively. FIG. 11 shows the phase error when no frequency offset compensation is used, and FIG. 12 shows the same when the present frequency offset compensation is used. It should be noticed that the phase error is much improved by the present invention. In FIGS. 11 and 12, the training period has 16 symbols duration, and the vertical axis shows the ratio of phase error.

In the above embodiment, the first operation step, and the second operation step are carried out for every burst signal. In one modification when the time variation of frequency offset is small and is possible to adjust by using the filter 23, it is possible to use the frequency offset at the end of the previous burst signal as the initial frequency offset in the present burst. In that case, the phase error and the frequency offset compensation amount should be monitored in case of sudden frequency offset.

In another modification of the present invention, the first operation step may be divided into two operation steps 1-a and 1-b. In the operation step 1-a, the initial value of the tap coefficients of the equalization process circuit 77a is determined by using the training series signal. In the operation step 1-b the tap coefficients are fixed to the values determined in the step (1-a), and the training series signal is equalized again. The phase error detector 19 detects the phase error with the fixed tap coefficients in the step 1-b. In this modification, as the tap coefficients are fixed, the phase error includes only the phase rotation of an input signal, and as the phase error is detected in the training period, the phase error up to ±180° is detected.

(c) Feedback learning

When equalization error exceeds a predetermined value during tracking period, tap coefficients are re-initialized during the tracking period in the present invention. This operation is called a feedback learning.

FIG. 5D, which is a part of FIG. 5A, shows a block diagram for the operation of feedback learning. In FIG. 5D, the numerals 11, 77a, 78 are the same as those in FIG. 5A. The numeral 100 is an output memory, which stores equalized output signal of the equalization process circuit 77a. It is assumed that the content of the output memory 100 has no error, as it has been equalized. The numeral 102 is a record signal strength information memory which stores the electromagnetic record signal strength information of receive signal. The field memory 102 stores the instantaneous electromagnetic field corresponding to the receive signal stored in the receive signal memory 11. The numeral 104 is a feedback learning control for effecting the re-initialization of the tap coefficients. Preferably, electromagnetic field strength to be stored in the record signal strength information memory 102 is taken in a control potential in an AGC amplifier (not shown) in a receiver.

The feedback learning is effected in the following three cases.

Figure 13A:
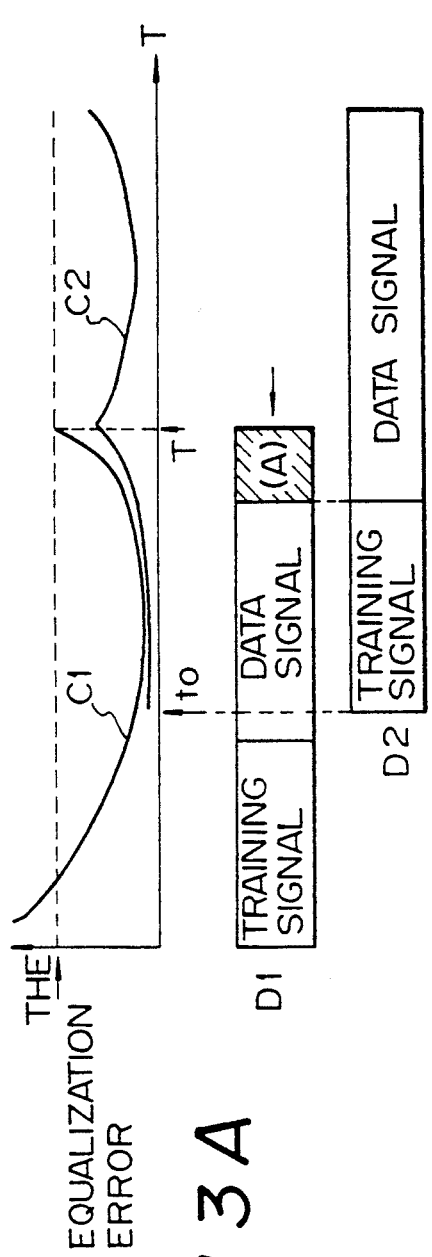
FIGS. 13A-13B shows the embodiment of a feedback learning according to the present invention.

(c-1) FIG. 13(a) shows the first case, in which the feedback learning is carried out when an equalization error e(i) exceeds a predetermined value. In an equalization operation, when the operation cannot follow the change of propagation path, an equalization error (e(i)) is first increased although no bit error happens, and when the equalization error exceeds a threshold, a bit error happens. Therefore, when the equalization error exceeds the threshold, the feedback learning is effected. This prevents a bit error.

In FIG. 13(a), the curve C1 shows the equalization error based upon the tap coefficients initialization utilizing the burst stored in the receive signal memory 11 as shown in D1. The equalization error rate C1 is going to increase as the data signal is equalized, and crosses the threshold level THE at time T. Then, the feedback learning is started at the time T. The training signal in this case is the equalized data signal stored in the output memory 100. The curve C2 in FIG. 13(a) shows the equalization error after the feedback learning, and the signal D2 shows the signal series in the feedback learning. The training signal in D2 is the same as the data signal in D1 beginning at time $t_0$, and the data signal in D2 is the succession of the data signal in D1. The data signal portion A in the first burst D1 residing around the time T when the equalization error exceeds the threshold, is not used as a training signal in the feedback learning. That portion A has low-reliability, as the equalization error is high.

The feedback learning is not restricted only once, but a plurality of feedback learning during each burst is possible.

Figure 13B:
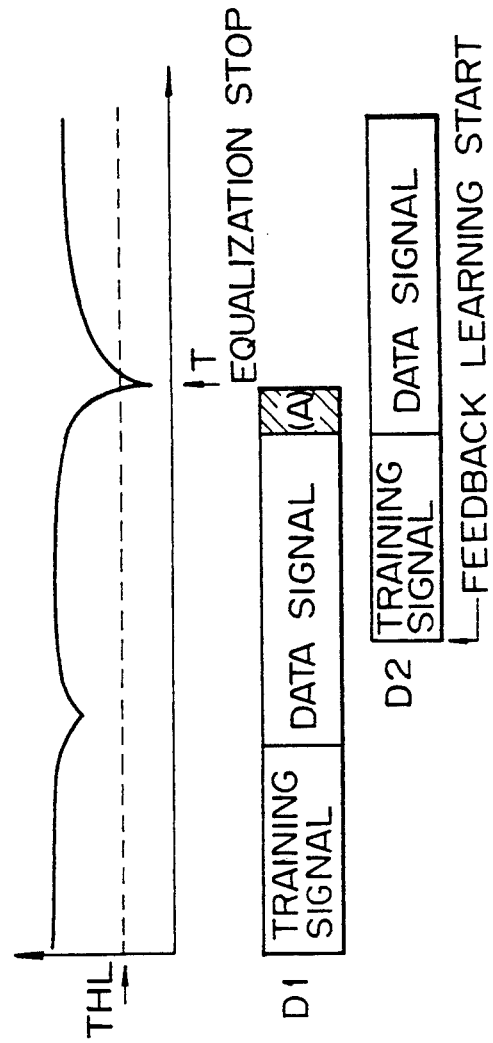

(c-2) FIG. 13(b) shows the second case, in which the feedback learning is started when the received electromagnetic field level is lowered below the threshold level THL. In a mobile communication circuit which is subject to the Rayleigh fading, the propagation condition changes significantly when the receive signal level decreases. Therefore, the feedback learning starts when the receive signal level decreases lower than the threshold level THL. In FIG. 13(b), the signal D1 shows a burst stored in the receive signal memory 11, and the signal D2 shows the signal stored in the output memory 100. The signal portion A around the time T when the receive level decrease lower than the threshold level is not used as a training signal in the feedback learning, since that signal A is unreliable.

The unreliable portion signal A is equalized in the present embodiment at the beginning of the tracking period after the feedback learning, and it should be noted that the tracking characteristics just after the training period are excellent, and will equalize the data signal even if the receive level is lower than the threshold level.

(c-3) Alternatively, the feedback learning starts in every predetermined intervals in each burst, and initializes the tap coefficients in every predetermined interval.

In above three embodiments c-1, c-2 and c-3, consecutive digits (1111 ... 11 or 000 ... 00) are not preferable as a training signal, so that consecutive digits are removed from the output memory 100 when feedback learning is effected.

Figure 14:
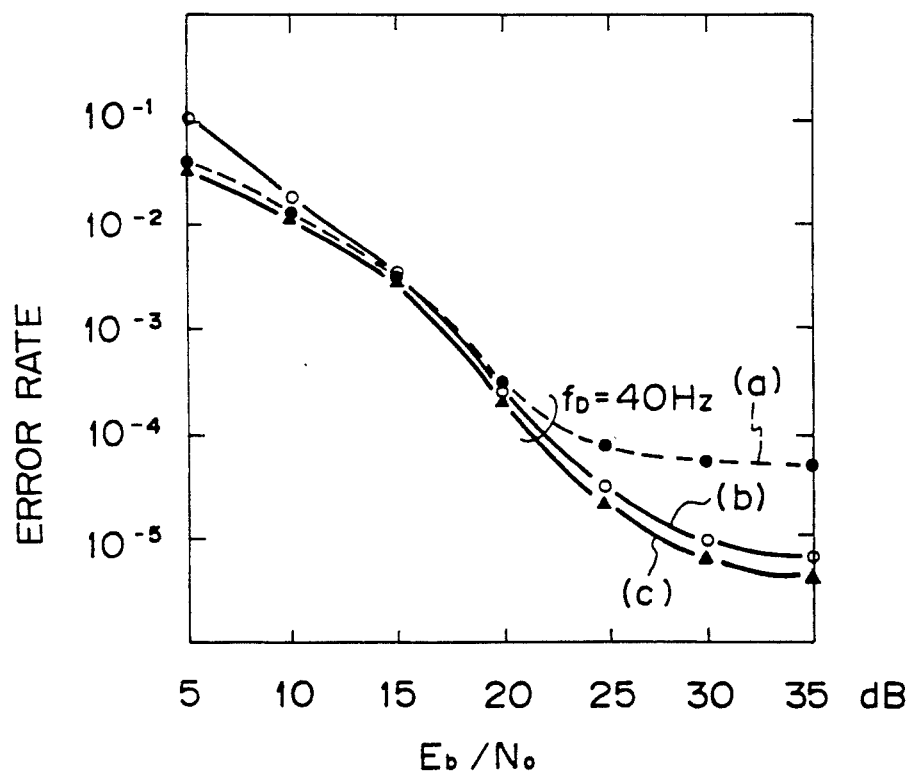
FIG. 14 shows the experimental curves of the feedback learning.

FIG. 14 shows the experimental curves of the feedback learning according to the present invention. In the figure, the horizontal axis shows $E_b N_0$ in dB where $E_b$ is signal power density for each bit, and $N_0$ is noise power density for 1 Hz of bandwidth. The vertical axis shows the bit error rate. The experiments were carried out in the condition that the fading frequency $f_d$ is $f_d = 40$ Hz. The curve (a) in the figure shows the case that no feedback learning is used. The curve (b) shows the case that the feedback learning described in c-3 is used, and the curve (c) shows the case that the feedback learning described in c-1 or c-2 is used. It should be appreciated that the curve (c) is better than the curve (a) in any value of $E_b/N_0$ As for the curve (b), the characteristics are better than the curve (a) when the value $E_b/N_0$ is high, but is worse than the curve (a) when the value $E_b/N_0$ is low. The reason of that is the feedback learning of c-3 uses an incorrect training signal when the value $E_b/N_0$ is low.

From the foregoing, it will now be apparent that a new and improved equalizer has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An equalizer for a radio receive signal comprising:
    a receive signal memory for storing a burst of receive signals each having a training series signal and a data series signal;
    an equalization process circuit for equalizing a signal read out of said receive signal memory and for providing equalized output signal at an output terminal, said equalization process circuit including
        a plurality of series connected delay elements each providing a predetermined delay time,
        a plurality of multipliers coupled with input/output of said delay elements for providing tap coefficients,
        an adder coupled with output of said multipliers to provide equalized output, and
        a tap coefficient calculator for adjusting tap coefficients according to equalization error of equalized output for a training series signal;
    an adaptive parameter calculator for calculating absolute value of a power of a tap coefficient for each tap; and
    a tap number decision circuit for determining whether each tap is used or not based upon a comparison of said absolute value with a predetermined value.

2. An equalizer according to claim 1, wherein when all the tap coefficients exceed said predetermined value, a number of delay elements together with taps is increased.

3. An equalizer according to claim 1, wherein said tap number decision circuit determines whether each tap is used or not based upon said absolute value of said power of said tap coefficient, and an absolute value of a gain vector of each tap coefficient.

4. An equalizer according to claim 1, wherein when a distribution of said absolute value of said power of said tap coefficients is asymmetrical, a training series signal is read out of the receive signal memory again for re-initialization of tap coefficients so that an address of the receive signal memory is shifted when compared with an address first read out of the receive signal memory.

5. An equalizer according to claim 1, further comprising:
    a phase error detector coupled with an output of said equalization process circuit for detecting phase error of said output of said equalization process circuit,
    a frequency offset estimator for providing frequency offset to be compensated in a training period according to detected phase error by said phase error detector,
    a multiplier located between an output of said receive signal memory and an input of said equalization process circuit for adjusting signal phase,
    an amount of phase adjustment by said multiplier being initialized by said frequency offset estimator, and then, controlled by an output of said phase error detector.

6. An equalizer according to claim 5, wherein an adjustment of tap coefficients of said equalization process circuit stops during detection of phase error by said phase error detector for operating said frequency offset estimator.

7. An equalizer according to claim 1, further comprising:
    an equalized output memory for storing equalized signal coupled with an output of said equalization process circuit,
    re-training control for effecting re-training of tap coefficients of said equalization process circuit by using content of said equalized output memory as a training series signal when equalized quality to data series signal is lower than a predetermined threshold.

8. An equalizer according to claim 7, wherein a receive signal strength information memory for storing a valve of an electromagnetic field of a receive burst is provided, and said re-training is effected when the value of the electromagnetic field in said receive signal strength information memory is lower than a predetermined threshold.

9. An equalizer according to claim 1, wherein said receive signal is a digitally modulated receive signal.

10. An equalizer according to claim 1, wherein said receive signal is a phase modulated receive signal.

11. An equalizer for radio receive signal comprising:
a receive signal memory for storing a burst of receive signal each having a training series signal and a data series signal;
an equalization process circuit for equalizing a signal read out of said receive signal memory and for providing an equalized output signal at an output terminal,
said equalization process circuit including a plurality of series connected delay elements each providing a predetermined delay time, a plurality of multipliers coupled with input/output of said delay elements for providing tap coefficients, an adder coupled with output of said multipliers to provide equalized output, and a tap coefficient calculator for adjusting tap coefficients according to equalization error of equalized output for a training series signal;
a phase error detector coupled with an output of said equalization process circuit for providing a phase error in an equalized output signal;
a frequency offset estimator for providing frequency offset to be compensated in a training period according to detected phase error by said phase error detector;
a multiplier located between an output of said receive signal memory and an input of said equalization process circuit for adjusting signal phase into said equalization process circuit,
an amount of phase adjustment by said multiplier being initialized by said frequency offset estimator, and then controlled by an output of said phase error detector.

12. An equalizer according to claim 11, wherein an adjustment of tap coefficients of said equalization process circuit stops during detection of phase error by said phase error detector for operating said frequency offset estimator.

13. An equalizer according to claim 11, further comprising:
an equalized output memory for storing an equalized signal coupled with an output of said equalization process circuit; and
re-training control for re-training of tap coefficients of said equalization process circuit by using content of said equalized output memory as a training series signal, when equalized quality to data series signal is lower than a predetermined threshold.

14. An equalizer according to claim 13, wherein a receive signal strength information memory for storing a valve of an electromagnetic field of a receive burst is provided, and said re-training occur when the valve of the electromagnetic field in the receive signal strength information memory is lower than a predetermined threshold.

* * * * *